United States Patent [19]

Kittelson et al.

[11] Patent Number: 4,909,880
[45] Date of Patent: Mar. 20, 1990

[54] METHOD AND APPARATUS FOR TAPE WINDING ON IRREGULAR SHAPES

[75] Inventors: Jeff L. Kittelson; James H. Campbell, both of Fort Worth, Tex.

[73] Assignee: General Dynamics Corporation, Fort Worth, Tex.

[21] Appl. No.: 195,121

[22] Filed: May 17, 1988

[51] Int. Cl.$^4$ ............................................. B32B 31/00
[52] U.S. Cl. ..................................... 156/189; 156/185; 156/361; 156/425; 156/429
[58] Field of Search ................ 156/189, 361, 425, 428, 156/429, 523, 574, 185, 191; 226/190

[56] References Cited

U.S. PATENT DOCUMENTS

| | | |
|---|---|---|
| 2,315,306 | 3/1943 | Wilhelm . |
| 2,694,535 | 11/1954 | Atti . |
| 2,747,649 | 5/1956 | Reed . |
| 3,112,234 | 11/1963 | Krupp . |
| 3,146,962 | 9/1964 | Hardwick . |
| 3,393,849 | 7/1968 | Hass ..................................... 226/194 |
| 3,438,587 | 4/1969 | Jackson, Jr. . |
| 3,574,040 | 4/1971 | Chitwood et al. ................... 156/522 |
| 3,761,341 | 9/1973 | Kimble . |
| 3,775,219 | 11/1973 | Karlson et al. ...................... 156/363 |
| 3,810,805 | 5/1974 | Goldsworthy et al. ........ 156/525 X |
| 3,846,202 | 11/1974 | Clarke . |
| 4,010,054 | 3/1977 | Bradt . |
| 4,035,878 | 7/1977 | Cheatham ....................... 226/196 X |
| 4,114,751 | 9/1978 | Nordin ............................. 226/196 X |
| 4,292,108 | 9/1981 | Weiss et al. ...................... 156/530 X |
| 4,319,944 | 3/1982 | Pope . |
| 4,328,057 | 5/1982 | Gutow . |
| 4,335,857 | 6/1982 | Pfost et al. ...................... 226/196 X |
| 4,488,685 | 12/1984 | Iida . |
| 4,574,029 | 3/1986 | Murray . |
| 4,588,466 | 5/1986 | Eaton ............................... 156/361 X |
| 4,596,619 | 6/1986 | Marks . |
| 4,697,759 | 10/1987 | Henderson et al. ............. 242/192 X |

FOREIGN PATENT DOCUMENTS 2130170  5/1984  United Kingdom .

Primary Examiner—Michael W. Ball
Assistant Examiner—Jeff H. Aftergut
Attorney, Agent, or Firm—James C. Fails; Charles E. Schurman; Arthur F. Zobal

[57] ABSTRACT

Method and apparatus for winding a tape smoothly onto an irregularly shaped mandrel or the like, including ends, characterized by tape storage and unreeling of packaged reels of tape to be wound smoothly onto the mandrel, mandrel rotational motor and gearing supporting and rotating the mandrel; delivery head roller for winding the tape onto the mandrel, a creel carrying the tape reel assembly, a creel rotating means adapted to rotate the creel to desired positions, an in-feed means carrying the creel and adapted to traverse normal to the mandrel, a traversing carriage carrying the in-feed means and adapted to traverse longitudinally of the mandrel; a controller for effecting movement of all the machines elements. The roller is freely rotatable and is pivotally mounted such that when moved longitudinally of the mandrel in both directions with the tape passing over it, the tape is wound smoothly onto the mandrel. The method of winding the tape smoothly onto the mandrel comprises employing the foregoing and unwinding the tape from the reel and supplying it untwisted to the freely pivotal head roller under the desired tension while following the envelope of the mandrel and while moving in both directions along the mandrel and rotating the mandrel such that the tape is wound smoothly onto the mandrel in a true helical pattern yielding complete coverage. Also disclosed are preferred embodiments.

10 Claims, 2 Drawing Sheets

METHOD AND APPARATUS FOR TAPE WINDING ON IRREGULAR SHAPES

FIELD OF THE INVENTION

This invention relates to fabricating composite irregular shapes such as aircraft intake (high strength ultimate shape) by winding upon a mandrel a laterally inflexible tape. More specifically, this invention defines a delivery system methodology and apparatus for the accurate, high quality placement of tacky or tackless ribbon, such as unidirectional composite tape, on the irregularly shaped mandrel during a helical winding operation.

DESCRIPTION OF THE PRIOR ART

The prior art is replete with a wide variety of different approaches to winding of a variety of types of laterally flexible materials from threads to elastomeric ribbons onto shapes such as cylinders and the like for fabricating a composite vessel wall or the like. The prior art fails to make obvious, however, the apparatus for doing or the method of winding a laterally inflexible tape in a true helical pattern around an irregularly shaped mandrel or the like such as for forming aircraft intakes for jet engines or similar use.

An Information Disclosure Statement submitted herewith delineates specific patents which were turned up in a preexamination search made before this application was filed.

A review of the prior art shows that the prior art has failed to suggest or make obvious Applicant's invention as set forth in the appended claims; namely, by winding laterally inflexible tape in a helical form over the irregular shaped mandrel to provide a composite vessel of irregular shape that can be cured in place on the mandrel or the like.

SUMMARY OF THE INVENTION

Accordingly, it is an object of this invention to provide an economical, straight-forward apparatus and method for winding lateral inflexible tape over an irregularly shaped mandrel or the like to form an irregular shape that can be employed for its desirable high strength and light weight.

It is a specific object of this invention to provide the method for forming a composite, irregular shape by winding tape in a true helical pattern over an irregularly shaped mandrel that has ends.

Another specific object is to provide an apparatus for winding tape in a true helical pattern over the irregularly shaped mandrel having ends.

These and other objects will become apparent from the descriptive matter hereinafter, particularly when taken in conjunction with the appended drawings.

In accordance with one embodiment of this invention, there is provided an apparatus for winding a tape smoothly onto an irregularly shaped mandrel characterized by: (a) tape storage and unreeling means for delivering a tape to be unreeled and wound smoothly onto the mandrel; (b) mandrel rotating means supporting the mandrel and adapted to rotate the mandrel; (c) a creel carrying the tape storage and unreeling means; (d) a creel rotating means supporting the creel and adapted to rotate the creel to desired positions so as to prevent twisting of the tape to the head roller; (e) in-feed means carrying the creel rotating means and adapted to traverse normal to the mandrel; (f) traversing carriage means carrying the in-feed means and adapted to traverse longitudinally of the mandrel, carrying the creel and roller longitudinally of the mandrel in both directions; and (g) freely pivotally mounted delivery head roller for winding the tape smoothly onto the mandrel, the roller being pivotally carried by the in-feed means. In this way the tape is smoothly wound onto the mandrel.

In another aspect of this invention, there is provided a method of winding the tape smoothly onto an irregularly shaped mandrel characterized by unwinding the tape from a reel and supplying it to a freely pivotal head roller for being wound onto the mandrel. Tape is uniformly tensioned and supplied untwisted to the head roller. The tensioned tape is passed over the head roller as the roller follows the envelope of the mandrel and is moved longitudinally in both directions at a desired speed along the spinning mandrel which is spinning at a desired rotational speed. In this way, the tape is wound smoothly onto the mandrel. As will be seen from the drawing and descriptive matter hereinafter, the laterally inflexible tape is wound smoothly around an irregularly shaped mandrel as it spins for forming on the mandrel an enclosed volumetric shape or the like.

One of the advantages of this invention is that once the tape is wound onto the mandrel in the predetermined shape, it can be cured on the mandrel or the like, as by curing at a controlled temperature for a desired period of time under designed conditions to obtain a high strength, lightweight structure.

After the curing is complete, the mandrel can be collapsed and withdrawn from the unusual shape. On the other hand, the composite structure can be cut and removed from the mandrel if desired. A great deal will be determined by the ultimate shape and use of the composite structure.

DESCRIPTION OF PREFERRED EMBODIMENTS

Figure 1:
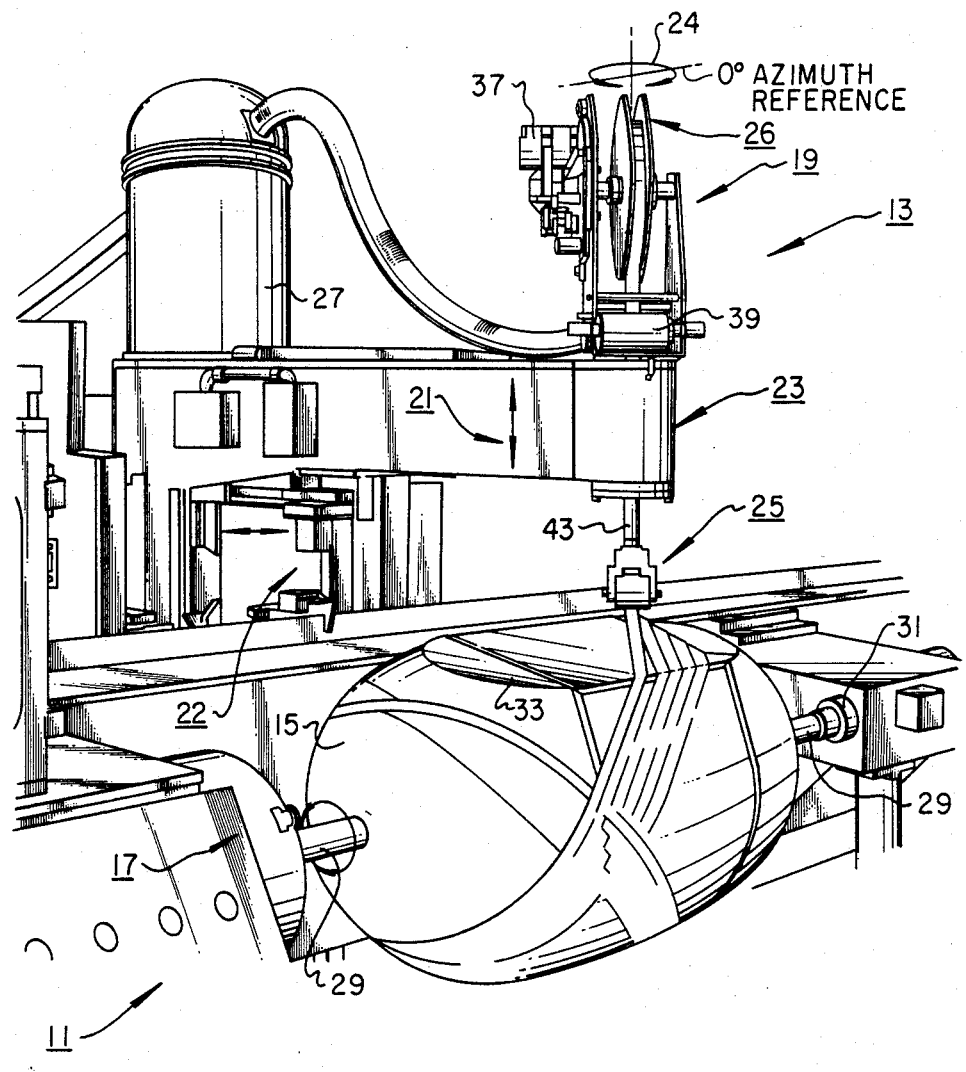
FIG. 1 is an isometric view of the apparatus of one embodiment of this invention.

It should be born in mind that this invention allows merely modifying a filament winding machine to wind a laterally inflexible tape such as unidirectional composite tape instead of the laterally flexible material such as composite rovings or a plurality of threads such as are typically used in winding operations. A laterally inflexible tape forms a band which is flexible across its width but is not flexible across its edge without wrinkling such as a piece of paper. Like a piece of paper, the tape buckles or wrinkles when distortion is attempted in the plane of the tape, as when wrapping on an irregularly shaped mandrel. Rovings are bundles of fibers usually 0.250 inch width or less that act as individual strands within a band of several rovings. They can be flexible laterally without wrinkling because the individual strands allow for individual change in path length around a contoured shape. On the other hand, it has been found that a laterally inflexible tape, or ribbon does not follow a natural path around a rotating complex shape or flat shaped mandrel without wrinkling when a non-modified, or ordinary, approach and apparatus are employed in trying to form composite structures.

We have found that we are able to employ a specially configured freely rotating delivery head which will allow an inflexible tape (laterally inflexible) to follow a natural path around a complex convex or flat mandrel and to lay smoothly onto the mandrel's surface without wrinkling. A controlled rotating creel is used in combination with the delivery head to maintain an untwisted tape or ribbon during the winding onto the mandrel. Thus, the point of contact of the untwisted tape with the mandrel is referred, ordinarily and herein, as the tape "tape lay-off onto the mandrel."

The invention was formulated through investigations that were conducted because of problems typically associated with fabricating thin-walled filament wound aircraft composite structures. The first studies on filament wound structure, for possible application on advanced fighter aircraft, were conducted using graphite/bismaleimide pre-preg (previously impregnated) roving. There were problems in co-locating the individual rovings to produce a band with a uniform fiber distribution. This is critical if the roving is to be used for parts requiring extreme material placement accuracies. The employment of unidirectional composite prepreg tape makes use of a predictable material form with a uniform fiber distribution. However, there are two concerns, readily apparent, when winding with a laterally inflexible tape. One is buckling or wrinkling of the tape and a second is material placement accuracy. These become even more of a concern when the shape of the part has complex curvature. The simplicity concept and forgiving nature of the system of this invention handles these two concerns with ease and makes possible the accurate repeatable and smooth placement of a tape in accordance with this invention.

It is believed that the reader will understand the principles that enable this invention to work more easily than the prior art approaches if apparatus is considered at this point.

Referring to FIG. 1, there is illustrated a typical control filament winding machine modified by replacing the standard filament delivery system with a novel payout device for paying out a laterally inflexible tape. The apparatus 11 includes a tape storage and unreeling means 13 for storing a tape to be unreeled and wound smoothly onto mandrel 15. The apparatus 11 also includes a mandrel rotating means 17 supporting the mandrel and adapted to rotate the mandrel at one or more rotational speeds; as desired; a creel 19 carrying a tape storage and unreeling means; an in-feed means 21 carrying the creel and adapted to traverse normal to the mandrel 15; a traversing carriage means 22 for moving the in-feed means and its creel longitudinally of the mandrel in both directions and a creel rotating means 23 supporting the creel and adapted to rotate the creel to an azimuth 24 that prevents twisting of the tape. The apparatus 11 also includes as an important element, a freely pivotally mounted delivery head roller 25 that is pivotally carried by the infeed means for facilitating the smooth wrapping of the laterally inflexible tape onto the irregularly shaped mandrel 15.

In general these type typical filament winding machines are well known and consist of a programmable controller for controlling the machine axes of motion. A spindle axis provides control rotational motion to the mandrel or tool. The horizontal axis creates the wind angle pattern by traversing a carriage from end to end of the mandrel in a programmed relationship with respect to the spindle axis. The in-feed axis provides controlled motion normal to the spindle axis. The rotational axis for the final placement instrument provides a means to maintain an appropriate azimuth of the placement instrument with respect to the wind angle pattern. Specifically, the applying device is an adaptation of conventional apparatus and the tapes themselves are conventional and do not require elaborate discussion. It is sufficient to note that unidirectional composite tape is laid down in sequential, woven or any combination thereof layers which can be cured at a suitable temperature, pressure and time. For example, pre-preg tape comprised of fibers and resin such as tetraglycidyl ether of bisphenol A can be cured with an aromatic diamine curing agent made by Ciba Geigy Resins Division, New York. U.S. Pat. No. 4,596,619 shows other applications of suitable resin in pre-preg tape to form high strength structures and similar fiber and resin composites described in suitable commercially available brochures showing acceptable cured strengths enough to withstand application stresses. For example, other suitably impregnated tapes using the 5250-2 System, a composite tape employing bismaleimide resin made by Narmco division of BASF, California. This tape when wound onto a suitable structure can be cured at about 375° F. and post cured at about 440° F. This is somewhat higher than many tapes and has special application. Another suitable tape uses the K-III System which is DuPont's condensation reaction polyimide. DuPont is located at Wilmington, Del. Ordinarily whether the tape is tacky or not, it will be wound onto the mandrel and then cured. It can be cured on the mandrel if desired. Ordinarily the catalyst or initiators, if they are employed in the tape, are frequently deemed proprietary but are widely used and well recognized in this art once a given company is told what resin is wished to be in the pre-preg tape. Preferred resins may also include those that may be B-staged at a relatively lower temperature; for example, about 100°-200° F. Suitable composite materials are well known and are described in issued patents. Accordingly, this patent application will not be encumbered by what is already in the public knowledge.

Looking at the apparatus 11 already described, the tape storage and unreeling means comprises a reel 26 on which the tape is packaged. The tape ordinarily is a material having a consistent width and a relatively thin thickness of about 2-15 mils. Conventionally, the material, or tape is reeled up on a central hub, creating a lengthy coil of material that can be easily dispensed. Some of the composite tapes that are tacky require a backing paper to serve as a separator film between the coiled layers of tape. This prevents the tape from sticking to itself. Where such tape is employed, a backing removing apparatus such as embodied in the vacuum system 27 may be employed to remove the backing. Again these type of vacuum removal systems for removing backing materials are old and do not require large descriptive sections.

The mandrel may comprise any suitable shape. It includes all complexly shaped tools. In the illustrated embodiment it is a complex cross-sectional shape with sharp corners, flat and changing convex contours and the like that are supported on a shaft 29. The shaft 29 generally has at its other end suitable bearing 31 for rotation at a desired rotational speed. Since the mandrel is fixedly connected with the shaft it, too, rotates at a desired rotational speed.

The mandrel rotating means 17 may comprise a suitable electric motor with or without suitable gearing to give the desired rotational speed to the shaft and hence to the mandrel 15.

As illustrated the mandrel 15 is a complexly cross-sectional shape with a squared-off (flat) surface 33. Winding a tape over the squared off surface 33 would ordinarily present problems with wrinkling of the tape.

With this invention, however, because of the freely rotatable head 25 and the rotatable creel 19, the tape does not tend to wrinkle at its edges.

Specifically, the two principle characteristics that make this invention work for winding laterally inflexible tape without wrinkling are the freely rotating delivery head roller and the roller geometry. The free rotating head with the tensioned tape ribbon passing over it uses the surface geometry of the mandrel tool together with its programmed machine axes to control its angular position with respect to the natural lay-down path. Therefore, the placement operation is simplified because the free-rotating head roller is purely responsive to winding forces and mandrel geometry and is not a programmed motion. This allows the tape ribbon to follow a natural path around the mandrel and to lay flat even over the end domes of the mandrel. For winding tape over such complex patterns, there are at least a couple of ways of doing the positioning of the creel, or the angle, or azimuth, at which the reel of tape takes to prevent twisting of the tape as it is fed over the roller 25. The first way and easiest way is to simply teach the computer controlling the creel rotating means what angle to have the creel in accordance with an empirical run through to mimic the motions of the head roller. The computer then is programmed to remember the azimuth oriented positions, to prevent twisting of the tape as it is fed over the head roller 25. As can be seen from the drawings and the descriptive matter, the preventing of the twisting of the tape is a programmed action to position the creel at the correct angle.

Otherwise, the position of the creel can be pre-programmed to rotate, illustrated by the curved arrows about azimuth 24 at the top of FIG. 1, to keep the tape from twisting. The pre-programming will depend markedly on the shape of the mandrel and the like and can be relatively complex so it is frequently advantageous to use empirical teaching of the computer by running it through one winding of the tape around the mandrel and causing it to remember respective positions and angles at each stage of the winding operation. By the keeping of the tape untwisted, the tape is enabled to follow the roller geometery and maintain its centered position without requiring special sensors and computer controls to keep it centered. The roller geometry, described in greater detail later herein maintains a ribbon position in the center of the roller, allowing the controlled axes of the filament winding machine to place the tape accurately at the desired angle. With these two characteristics, the free rotating head and the roller geometry, material placement speed and accuracy is limited primarily by the speed and accuracy of the filament winding machine, assuming the tape has been manufactured to acceptable width and thickness tolerances as specified by design. We have found that best results are obtained when the ratios of the diameter of the mandrel to the width of the tape is limited to about 25 to 1. Expressed otherwise, any tape up to about one inch wide may be employed when the diameter of the mandrel is up to two feet or so in diameter (about 24 to 25 inches). Anything less than 25 to 1 incurs risk. For example, a two inch wide tape would have the risk of wrinkling if used on a mandrel having only about two feet in diameter. On the other hand, if the mandrel were about fifty inches in diameter, a tape up to two inches wide could be employed without undue risk of wrinkling.

As the tape comes off the tape reel 26 on the creel 19, it is guided to the mandrel maintaining no twisting of the tape. Specifically, the creel rotating means 23 provides controlled rotational movement for the creel 19 in order to keep the tape parallel to the program winding angle during placement. The creel rotating means 23 allows rotating of the creel to a desired azimuth 24 to facilitate smooth placement of the material by preventing the tape from twisting within the delivery system.

The in-feed means 21 provides controlled motion normal to the spindle axis of the shaft 29, or the mandrel 15. This assists in placing a tape on a complex region of a mandrel tool such as the end domes by allowing the delivery head to follow a path envelope best suited for particular mandrel geometry. Thus, inherently, the in-feed means provides a path or means for vertically traversing a tape and preventing twisting of any such tape. Specifically, the creel rotating means includes the means for keeping a perpendicular axis of any such tape when any such tape is located at the in-feed means between the creel and a tape lay-off onto the mandrel aligned in substantially the same angle as the axis of the tape at the location of any such lay-off onto the mandrel.

A tension controller 37 is provided for controlling the tensional force on the tape to hold it uniform across the width of the tape. The applied tension must be sufficient to hold the tape ribbon onto the mandrel without slippage and to enable the tape to lay down smoothly without wrinkling. A gross amount of tension will eventually cause the tape to curl upon itself creating an unacceptable band for placement. Thus, the amount of tension that has to be controlled can be determined empirically through these guidelines. The creel 19 also includes guide components 39 that direct the tape to the delivery head. These guide components should be virtually frictionless in order to prevent damaging the tape as it passes through them. The tape that has backing paper requires a backing removing system 27 to collect and dispose of the film. Such a device is employed frequently in conventional stripping method and apparatus. A suitable means for removing backing paper may comprise using a chopping or shredding apparatus within the vacuum system. This chops up the backing paper that is removed and prevents pile up that may be unacceptable. Also, take-up reels or other devices could be employed to take up separated backing film cleanly and efficiently if desired.

Figure 2:
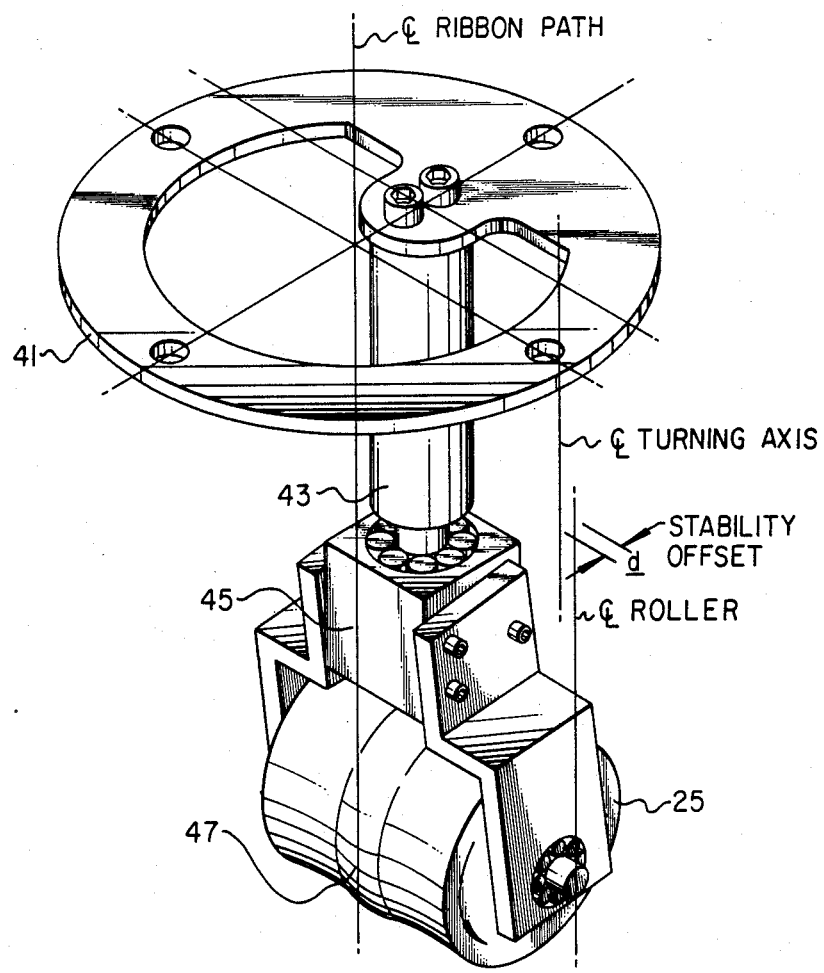
FIG. 2 is an isometric view of the roller head of FIG. 1 showing greater detail.

The tape winding delivery system has the tape guided by the creel under tension to the delivery head assembly shown in FIG. 2. As will be understood more nearly completely, the roller head 25 is preferably convex. Expressed positively, it must be non-concave and the delivery head assembly is made up of four primary working parts as follows. The parts are the support frame 41, FIG. 2, the turning axis 43, the free rotating swivel bracket 45 and the delivery head roller 25.

The support frame 41 is used to bracket the assembly onto the creel rotating means 23 and/or the in-feed means 21. Fastening the support frame 41 to the creel rotating means 23 is the preferred approach because then the design of the support frame is much simpler.

Any other satisfactory means to accomplish the desired results can be employed.

The turning axis 43 simply provides the axis of rotation for the delivery head roller 25. The turning axis 43 should be located such that the relative distance to the tape path is less than the radius of the roller.

The free rotating swivel bracket 45 rides on the turning axis 43 and provides a means for the delivery head roller 25 to turn about the turning axis 43. The ability for the roller to turn freely about the turning axis 43 is a key feature that enables the assembly to perform properly and with success.

The delivery head roller 25 is the final controlling instrument within the delivery system needed to place the tape onto the spinning mandrel. The surface of the roller should be such that adequate frictional forces are generated between the roller and the tape ribbon to prevent slippage and material damage. For instance, a roller with a surface consisting of polyurethane (hardness of 85 A using the Shore hardness scale) provides a good surface interface with graphite/epoxy unidirectional composite tape. The head roller 25 has a centering arch 47 that is located near its center longitudinally and peripherally about its midpoint. The head roller can be convex in cross-sectional shape if desired and the centering arch is not necessary but the centering arch has been found helpful in centering the tape. Specifically, the centering arch is a raised, gently contoured, area on the surface of the roller that acts as a natural centering guide that the tape can follow during placement of the tape. If the tape moves off the center of the roller 25, an unbalanced tensional force distribution is generated across the width of the tape causing the tape to "walk" back to reach a balanced state, thereby recentering itself. A centering feature is part of the roller surface geometry and is a key constituent in enabling the assembly to function properly. Other more elaborate centering techniques; such as, electric eye detectors in conjunction with a computer; may be used or developed depending upon the use to which the tape winding machine or apparatus is put, but they suffer from the disadvantage of greater complexity and expense.

The stability offset is the relative distance d between the center lines of the delivery head roller 25 and the turning axis 43. This offset provides the roller with a turning stability when the angle of the material placement is reversed, for example, on the end dome of the mandrel, during a helical winding operation.

As will be appreciated, the computer controlled axes of motion; mandrel rotating means 17, traversing carriage means 22, creel rotating means 23, and in-feed means 21 are well known and need not be described in great detail herein. If desired, Hall effect devices or the like can be employed to generate pulses, or spikes that can be counted by computers and control the distance or rotational and speed of movement of the machine axes.

Although this invention has been described with a certain degree of particularity, it is understood that the present disclosure is made only by way of example and that numerous changes in the details of construction and the combination and arrangement of parts may be resorted to without departing from the spirit and the scope of the invention, reference being had for the latter purpose to the appended claims.

What is claimed is:

1. An apparatus for winding a laterally inflexible tape smoothly around an irregularly shaped mandrel, including ends, for forming on the mandrel and enclosed volumetric shape or the like, comprising:
    a. tape storage and unreeling means for delivering a tape to be unreeled and wound smoothly onto the mandrel;
    b. mandrel rotating means supporting the mandrel and adapted to rotate the mandrel as desired;
    c. a creel carrying said tape storage and unreeling means;
    d. a creel rotating means supporting the creel and adapted to rotate the creel to desired positions;
    e. an in-feed means carrying the creel rotating means and adapted to traverse normal to the mandrel; said in-feed means having a means for vertically traversing a tape; and said creel rotating means having means for keeping the perpendicular axis of a longitudinal axis of any tape when such tape is located at the in-feed means between said creel and a tape lay-off onto said mandrel aligned at substantially the same angle as the axis of such tape at the location of said lay-off onto said mandrel;
    f. a traversing carriage means carrying said in-feed means and adapted to traverse longitudinally of the mandrel in both directions as desired; and
    g. freely rotatably mounted delivery head roller for winding the tape smoothly onto the mandrel; said roller being rotatably carried by said in-feed means so as to rotate about its shaft responsive to tension on any such tape traversing over said head roller and thereby prevent twisting of the tape being delivered to said mandrel;

whereby a laterally inflexible tape can be smoothly and evenly wound onto said mandrel.

2. The apparatus of claim 1 wherein said creel includes a tape reel having a tape wound thereonto.

3. The apparatus of claim 1 wherein said head roller is convex.

4. The apparatus of claim 3 wherein said head roller includes a centering arch, said centering arch being disposed near the longitudinal midpoint of said roller and disposed about the periphery of said roller.

5. The apparatus of claim 1 wherein said mandrel, even with the tape thereon is movable to a curing facility for curing the tape wound in place on the mandrel.

6. A method of winding a laterally inflexible tape smoothly onto an irregularly shaped mandrel having ends comprising the steps of:
    a. unwinding the tape from a reel and supplying said tape with ample tension and substantially no twist to a freely pivotal head roller for being wound onto the mandrel without said roller pressing against said mandrel; and
    b. passing a tensioned and untwisted tape, and roller, along an envelope of the mandrel and moving longitudinally in both directions along the mandrel while rotating the mandrel, both passage and the rotation being controlled as desired such that the tape is wound smoothly and evenly onto the mandrel.

7. The method of claim 6 wherein the tape has been wound onto the mandrel and the mandrel is complexly contoured to form an irregularly shaped finished shape; and the tape is cured in place on the mandrel.

8. The method of claim 6 wherein said freely pivotally head roller is maintained spaced from said mandrel and is adapted to take a tape up to two inches in width and maintain it centered; wherein said freely pivotal head is mounted on a freely rotating swivel bracket and eccentrically mounted a distance d off center line so as to be responsive to tensional forces of any tape traversing thereover.

9. The method of claim 6 wherein said untwisted tape is maintained untwisted by a programmable means for controlling the angle of a creel with respect to a mandrel axis and wherein a freely pivotal mounted head cooperatively insures that the tape is wound at the proper angle responsive to tension over said freely pivotally mounted head which is eccentrically mounted a distance d off center so as to be responsive to tensional forces of any tape traversing thereover.

10. The method of claim 9 wherein there is maintained an untwisted tape and said untwisted tape is maintained at less than a maximum in the area of about 1/25 width of the rotating mandrel at its maximum width.

* * * * *